United States Patent [19]

Wheeler

[11] 4,242,674
[45] Dec. 30, 1980

[54] ALTERNATOR FAILURE WARNING INDICATOR

[76] Inventor: Edward W. Wheeler, R.F.D. #2, Elizabethton, Tenn. 37643

[21] Appl. No.: 1,919

[22] Filed: Jan. 8, 1979

[51] Int. Cl.³ .............................................. G08B 21/00
[52] U.S. Cl. ..................................... 340/635; 320/48; 340/645; 340/650; 340/653; 340/658; 340/27 R
[58] Field of Search ............... 340/645, 658, 659, 657, 340/635, 663, 27 R, 650, 651, 653; 320/48

[56] References Cited

U.S. PATENT DOCUMENTS

| Re. 26,651 | 8/1969 | Blackburn | 340/658 X |
|---|---|---|---|
| 3,168,693 | 2/1965 | Eckenfelder | 322/28 |
| 3,210,603 | 10/1965 | Calfee et al. | 310/68 R X |
| 3,401,308 | 9/1968 | Darke | 340/658 X |
| 3,479,575 | 11/1969 | Wright et al. | 320/48 |
| 3,492,559 | 1/1970 | Harris | 320/48 |
| 4,027,204 | 5/1977 | Norbeck | 340/663 X |

Primary Examiner—John W. Caldwell, Sr.
Assistant Examiner—Daniel Myer
Attorney, Agent, or Firm—Adrian J. Good

[57] ABSTRACT

A transistorized detector sensitive to the ripple component of the DC output of an alternator gives a visual or audible warning signal when the ripple component exceeds a predetermined level providing early indication of failure of either a winding or rectifier diode.

1 Claim, 1 Drawing Figure

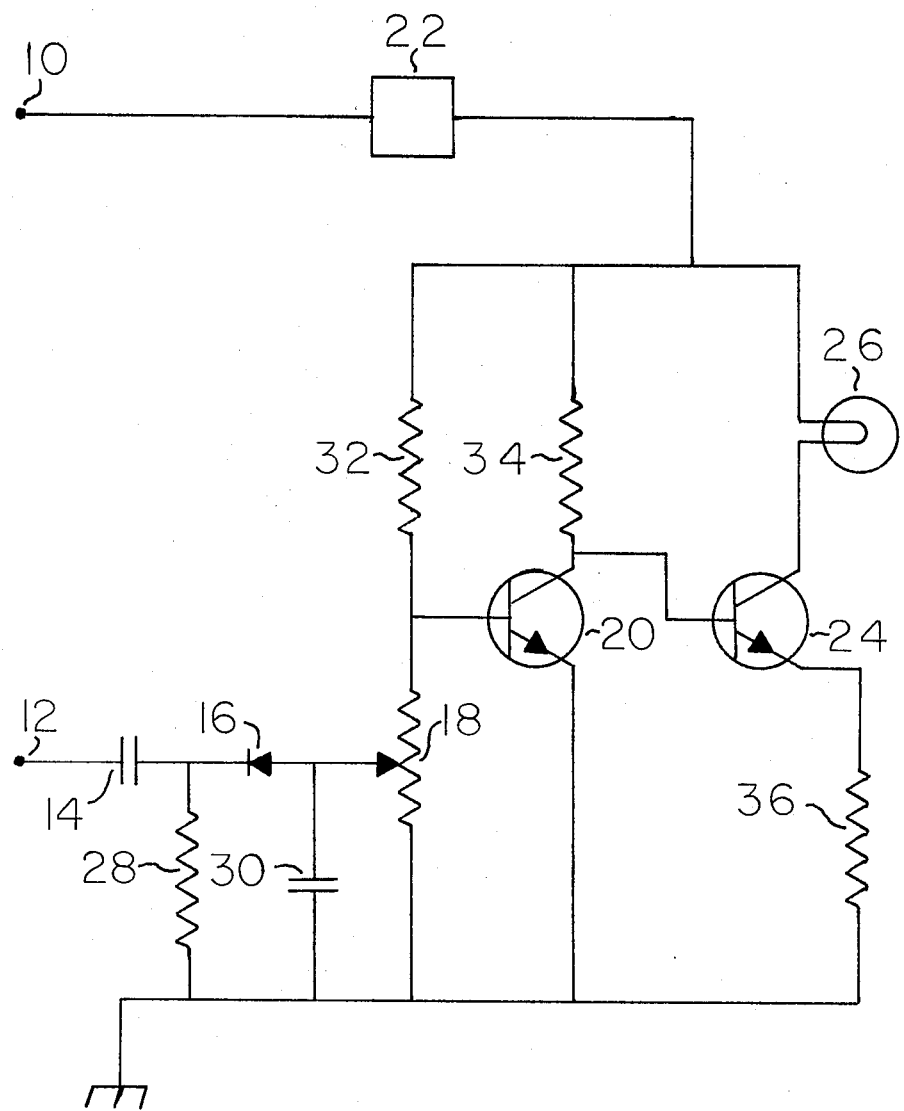

ALTERNATOR FAILURE WARNING INDICATOR

BACKGROUND OF THE INVENTION

The electrical circuits on both land and aeronautical vehicles commonly include a battery serving as a current storage reservoir and an alternator serving as the current source, with solid state diodes serving to rectify the alternating current produced by the alternator to a direct current.

For most of the applications needing electrical power on an aircraft, such as lights, landing gear actuators, and hydraulic power sources, a small amount of an AC component of the DC power is not objectionable, the normal output of the alternator system including less than 1% of ripple current.

An alternator can fail in several ways. A short circuit can develop in one of the windings, causing excessive current to flow through the shorted winding due to the drop in resistance, lessening the amount of magnetic flux due to the loss of the shorted windings from the circuit. This in turn will lessen the total output of the generator and set up an imbalance in the amount of current produced by the windings, causing an AC ripple in the DC output of 5% or more. A failure of one of the rectifying diodes will also cause an imbalance, thereby increasing the AC component of the total current.

The equipment is generally designed with generous overload tolerances, however, and failure of one part does not usually cause immediate failure of the whole system. The alternator will continue to function, but the increased electrical stress placed upon the system will eventually cause an increase in physical stress, usually in the form of heat, or arcing, and the total system will fail in an avalanche fashion. The increased AC component of the current may also cause some equipment malfunctions in those systems particularly sensitive to current variations such as the instruments and radio equipment. Any malfunctions in these areas are of particular concern to the safety of aircraft for obvious reasons.

The period of time from the appearance of the first symptoms of incipient failure until the occurrence of complete failure may vary from several minutes to many hours of operation in typical aircraft systems. This interval has heretofore been one principally of blissful but deadly ignorance on the part of light plane pilots in particular. This invention provides for the first time a simple, light, and economical warning of such an incipient failure.

Previous efforts in the area include the following known U.S. patents and other references:

U.S. Pat. No. 3,168,693 Eckenfelder Feb. 2, 1965, discloses a voltage regulator which uses the DC ripple to determine the total voltage output, and to regulate the exciter circuit of AC generator. This device will limit the exciter current and presumably prevent further damage in case of a component failure but will not give warning to the pilot unless he is watching the generator output meter.

U.S. Pat. No. 3,210,603, Calfee, et al., Oct. 5, 1965, discloses a system to protect brushless AC generators from rectifier failure or exciter armature winding insulation failure. The ripple current and the ripple frequency of the exciter field, at a predetermined level, activate a Zener diode to interrupt the exciter field current. This system, like Eckenfelder above, will limit exciter current but will not give any warning to the pilot.

U.S. Pat. No. 3,479,575, Wright, et al., Nov. 18, 1969, discloses an indicating device for a battery charging current. This system will indicate only a total failure of the electrical generation system and will not detect an incipient failure.

U.S. Pat. No. 3,492,559, Harris, Jan. 27, 1970, discloses a voltage sensitive indicator which activates a warning light when the voltage is too high or too low. This device will only, like Wright above indicate when generator output is grossly in error, and will not detect an incipient failure.

Further background is shown in the brochure copy enclosed from Ward Aero, WA 165, Rev. 2-75. No information is available on the circuitry involved in this instrument.

SUMMARY OF THE INVENTION

The alternating current component of the total output current of alternators is measured by bringing the signal through a blocking capacitor, which passes the alternating signal, and then through a diode which acts as a half-wave rectifier. This signal is then fed through a variable resistance to the base of the first of two transistors. With no signal the first transistor is conductive and the second transistor is nonconductive. When an AC signal appears on the line, the first transistor becomes nonconductive and the second transistor conductive, activating the alarm, which may be a warning light, horn, or any suitable alarm.

The advantages of this system are in the early warning of incipient failure by a simple, inexpensive, small, and lightweight means of great reliability and adaptability.

DESCRIPTION OF THE PREFERRED EMBODIMENT

The single embodiment drawing shows a typical installation suitable for either a 12- or 24-volt electrical system powered by an alternator with positive and negative terminals 10 and 12.

Capacitor $C_1$, 0.47 $\mu f$, 14, in the lead to ground, 12, of the device, isolates the system from direct current but allows the alternating current component to pass.

Diode $D_1$, 16, 1N270 rectifies the alternating current, allowing electron flow through variable resistor $R_3$, 18, 100K to the base of $TR_1$, 20, 2N2925. Normally, the positive voltage from the alternator, controlled by integrated circuit 22, Radio Shack #R.S.-7812, keeps $TR_1$, 20, turned on and $TR_2$, 24 2N3567, turned off. Lamp 26, #330 has no ground when $TR_2$ is off and does not light.

An AC input, rectified through diode 16, turns $TR_1$, 20, nonconductive, and simultaneously $TR_2$, 24, conductive. Bulb 26 then has a ground from the current at 10 and lights in warning. A horn or other warning device may be substituted for bulb 26.

In operation, since the device is intended for use in a broad range of aircraft, $R_3$, 18, is adjusted to turn the warning on at any desired level of AC signal input.

The voltage regulator, 22, makes it possible to use the circuit on either 12- or 24-volt systems without alternations. Resistors or ½ Watt as follows: 32 is 460K ohms, 34 is 5.6K ohms, 36 is 22K ohms, and 28 is 3.9K ohms. Capacitor 30 is 0.047 $\mu f$.

The device illustrated herein is one means of accomplishing the desired result, and this disclosure is not limited to that one means.

I claim:

1. In an aircraft equipped with an electrical system comprising an alternator with solid state diode rectifiers producing direct current as the principal component of the total current output when operating normally, the improvement comprising a warning indicator selected from the group consisting of those giving visible and audible signals, said indicator giving a tangible warning to an aircrew member of said aircraft when the alternating current component of said total current reaches a predetermined level symptomatic of incipient failure of some component of said alternator or said solid state rectifiers, said indicator comprising means conducting current from said electrical system to switching means responsive to a preselected level of the alternating current from said electrical system comprising, in the positive side of said switching means, an integrated circuit which will accept an input ranging from 12 to 24 nominal volts and have an output of 12 nominal volts, in the negative side a blocking capacitor, a diode rectifier and a variable resistance controlling the voltage to the base of an NPN transistor, the collector of said transistor directly connected to the base of a second NPN transistor such that when said first transistor is conducting said second transistor is non conducting and vice versa such that when said first transistor is non-conducting said second transistor is conducting current in series with said warning indicator and activating said indicator, the level of said alternating current which will activate said indicator being controlled by a preselected level of said variable resistance.

* * * * *